United States Patent [19]
Ford et al.

[11] Patent Number: 5,745,271
[45] Date of Patent: Apr. 28, 1998

[54] ATTENUATION DEVICE FOR WAVELENGTH MULTIPLEXED OPTICAL FIBER COMMUNICATIONS

[75] Inventors: Joseph Earl Ford, Oakhurst; David Andrew Barclay Miller; Martin C. Nuss, both of Fair Haven; James Albert Walker, Howell, all of N.J.

[73] Assignee: Lucent Technologies, Inc., Murray Hill, N.J.

[21] Appl. No.: 690,696

[22] Filed: Jul. 31, 1996

[51] Int. Cl.$^6$ .............................. H04J 14/02; G02B 6/00
[52] U.S. Cl. .............................................. 359/130; 385/140
[58] Field of Search ...................... 359/127, 128, 359/130–131, 161, 126; 385/10, 24, 37, 140

[56] References Cited

U.S. PATENT DOCUMENTS

5,526,155  6/1996  Knox et al. ........................... 359/130

*Primary Examiner*—Kinfe-Michael Negash

[57] ABSTRACT

An optical signal attenuation device and associated method for selectively attenuating the signal strengths of different wavelength signals contained within a multiplexed optical transmission. The attenuation device includes a diffracting element that diffracts the multiplexed optical system and directs the different wavelength signals onto separate optical paths. A modulator array is provided that contains a plurality of optical modulators spaced at a pitch so that each modulator receives one of the different wavelength signals. Each optical modulator causes a signal to be produced that correspond to the signal it receives, except that the signal strength of the emitted signal is altered to fall within a desired range. Each signal emitted by the optical modulators is again directed toward a diffraction element. The diffraction element combines the separate wavelength signals, thereby producing a multiplexed signal where each wavelength has a signal strength that falls within a common range.

29 Claims, 4 Drawing Sheets

ATTENUATION DEVICE FOR WAVELENGTH MULTIPLEXED OPTICAL FIBER COMMUNICATIONS

BACKGROUND OF THE INVENTION

1. Field of the Invention

The present invention relates to attenuation devices and methods for selectively adjusting the variation between signal levels for different optical channels in a wavelength division multiplexed optical network.

2. Description of the Prior Art

In multiplexed optical fiber communications, a single optical fiber often carries multiple independent data channels, wherein each data channel is assigned to a distinct optical wavelength. As signals propagate through a fiber optic network, the signals experience both transmission losses and coupling losses from point to point within the network. In order to compensate for transmission losses and coupling losses, the multiplexed signals carried by an optical fiber are often amplified at various points in the network using an Erbium-doped fiber amplifier or the like. Erbium-doped fiber amplifiers amplify each optical wavelength contained within the multiplexed signal. However, the amplification gain provided by the Erbium-doped fiber amplifier is not even. Rather, certain wavelengths are amplified to a much greater degree than are other wavelengths. As a multiplexed signal experiences multiple cycles of transmission losses, coupling losses and then amplification, the variations in intensity between different wavelengths grows. If not corrected, the uneven signal strengths may result in interchannel crosstalk and the loss of the data being transmitted.

In the prior art, systems and methods have been developed to compensate for the uneven wavelength dependent gain of Erbium-doped fiber amplifiers in optical fiber communications. One such prior art technique is to proactively compensate for the uneven gain of an Erbium-doped fiber amplifier by pre-emphasizing the input levels of signals carried by the optical fiber. Such a prior art technique is exemplified in "END TO END EQUALIZATION EXPERIMENTS IN AMPLIFIED LIGHTWAVE SYSTEMS" by A. R. Chraplyvy et al., IEEE Photonics Technology Letters, 4(4), pp. 428–429 (April 1993). A second prior art technique to compensate for the uneven gain of an Erbium-doped fiber amplifier is to use in-line optical filters. The optical filters attenuate the wavelengths having the greatest degree of amplification, thereby creating a more even signal strength across all the signal wavelengths. Such a prior art technique is exemplified in "TUNABLE GAIN EQUALIZATION USING A MACH-ZENDER OPTICAL FILTER IN MULTISTAGE FIBER AMPLIFIERS", by R. Inoue et al., IEEE Photonics Technology Letters, 3(8), pp. 718–720, (April 1991). Also see U.S. Pat. No. 5,430,817 to Vengsarker, entitled OPTICAL SYSTEMS AND DEVICES USING LONG PERIOD SPECTRAL SHAPING DEVICES.

A disadvantage of correction systems that use pre-emphasis or fixed filter attenuation is that such prior art systems only work in applications where a multiplexed signal has a known input power, the multiplexed signal travels along a known path, and the path has fixed losses and a fixed degree of amplification. However, in many wavelength division multiplexed optical fiber communication applications, there are no fixed optical paths. Rather, in many such applications, the optical fibers within a network are switched, thereby creating a large variety of different optical paths for any one given signal. Since switched wavelength division multiplexed networks have variable degrees of amplification, variable transmission losses and variable coupling losses that depend upon how the optical fibers are switched, amplification compensation systems that depend upon fixed parameters cannot be used.

A need therefore exists in the art for an attenuation device that can independently and actively attenuate each wavelength channel used in wavelength division multiplexed optical fiber communications.

SUMMARY OF THE INVENTION

The present invention is an optical signal attenuation device and associated method for selectively attenuating different wavelength signals contained within a multiplexed optical transmission. The attenuation device includes a diffraction element that diffracts the multiplexed optical system and directs the different wavelength signals onto separate optical paths. A modulator array is provided that contains a plurality of optical modulators spaced at a pitch so that each modulator receives one of the different wavelength signals. Each optical modulator reflects or transmits a signal that corresponds to the signal it receives except that the average signal strength of the reflected or transmitted signal is reduced to fall within a desired range. Each signal reflected or transmitted by the optical modulators is again directed toward a diffraction element. The diffraction element combines the separate wavelength signals, thereby producing a multiplexed signal where each wavelength has a signal strength that falls within a common range.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention device and method can be used in any application where it is desirable to attenuate specific signal wavelengths in a multiplexed signal, the present invention device and method are especially well suited for selectively attenuating signals to compensate for path dependent losses in multiplexed optical fiber communications. As such, by way of example, the present invention device and method will be described in an application of a switched wavelength division multiplexed optical fiber system containing a plurality of paths that each contain a unique degree of signal loss.

Figure 1:
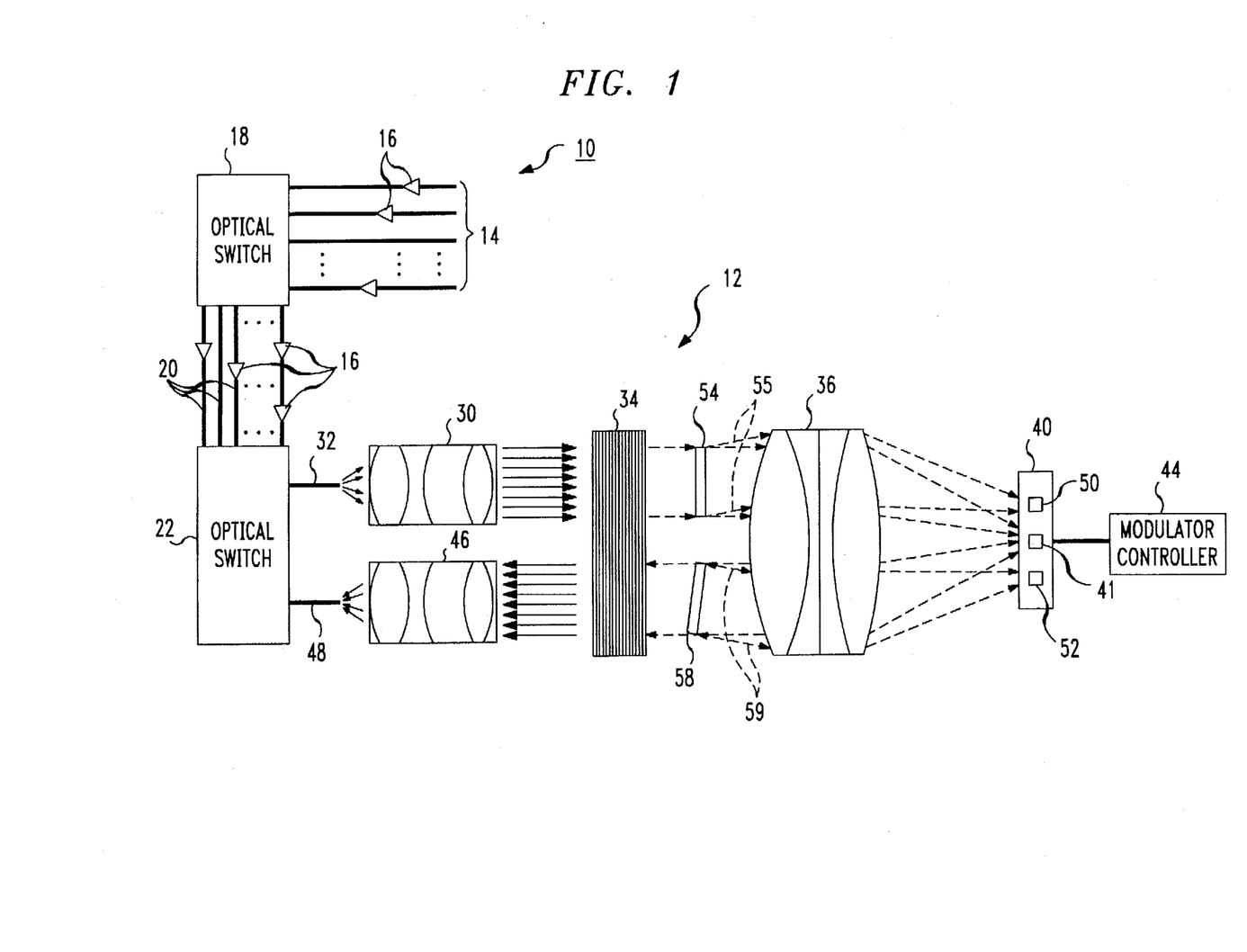
FIG. 1 is a schematic view of an embodiment of an optical signal equalizer in accordance with the present invention, shown as part of a wavelength division multiplexed system.

Referring to FIG. 1, there is shown a switched wavelength division multiplexed optical fiber system 10 containing the present invention attenuation device 12. The wavelength division multiplexed optical fiber system 10 contains a network of optical fibers 14, each capable of carrying a multiplexed signal. Each of the optical fibers 14 has a given transmission loss, coupling loss, splitting loss and may or may pass through any number of Erbium-doped fiber amplifiers 16. At various points within the wavelength division multiplexed optical fiber system 10, there may be an optical switch 18 that selectively couples one of the first optical fibers 14 to any one of a plurality of subsequent optical fibers 20. Each of the subsequent optical fibers 20 has its own transmission loss, coupling loss, splitting loss and may or may pass through contain any number of Erbium-doped fiber amplifiers 16. Although only one set of subsequent optical fibers 20 is shown, it will be understood that the wavelength division multiplexed optical fiber system 10 may contain multiple optical switches and multiple sets of subsequent optical fibers.

At some point within the wavelength division multiplexed optical fiber system 10, an optical switch 22 is provided that selectively couples one of the subsequent optical fibers 20 to an input fiber 32 used within the attenuation device 12. Due to the complexity of the networking in the wavelength division multiplexed optical fiber system 10, the sum total transmission losses, coupling losses, splitting losses and the degree of signal amplification along a given optical path may not be known. The attenuation device 12 imposes an arbitrary relative average intensity on each of the wavelength signals carried by the optical fiber regardless of the variables of loss and amplification experienced by the multiplexed signals before entering the attenuator. The signals can either be equalized or they can be preemphisized at the particular intensity levels which will yield equal signal strengths at the network.

In the embodiment of FIG. 1, the attenuation device 12 includes a first collimator lens arrangement 30 that is optically aligned with the input fiber 32. The input fiber 32 is brought to a flush termination, wherein the multiplexed optical signal carried by the input fiber 32 is emitted toward the first collimator lens arrangement 30. The lens elements contained within the first collimator lens arrangement 30 are selected to focus all the wavelengths emitted by the input fiber 32 at a substantially infinite conjugate, thereby substantially collimating all of the wavelengths. A blazed diffraction grating 34 is positioned along the same optical path as the first collimator lens arrangement 30. The collimated multiplexed light signal exiting the first collimator lens arrangement 30 impinges upon the blazed diffraction grating 34 wherein each wavelength of light is dispersed at an angle proportional to its wavelength. The various wavelengths received by the blazed diffraction grating 34 are directed toward a focusing lens arrangement 36. The diameters of the various lens elements contained within the focusing lens arrangement 36 are sized so that the focusing lens arrangement 36 receives all the wavelengths from the blazed diffraction grating 34 along a path that is off center with respect to the optical axis of the focusing lens arrangement 36. As will later be explained, the off-center first path through the focusing lens arrangement 36 enables the various wavelengths to be reflected back through the focusing lens arrangement 36 along a second path, without the first path and the second path interfering with each other.

The focusing lens arrangement 36 focuses the various wavelengths of light at different points on a modulator array 40. The modulator array 40 preferably contains silicon-based modulators 41 having an operating wavelength range of between 1540 nm and 1570 nm, a moderate dynamic range of less than 10 dBs and a speed of less than 1 ms. A suitable modulator 41 would be the mechanical anti-reflection switch (MARS) modulator developed at AT&T Bell Labs and described in "SILICON MODULATOR BASED ON MECHANICALLY ACTIVE ANTI-REFLECTION LAYER WITH 1 Mbit/s CAPABILITY FOR FIBER IN THE LOOP APPLICATIONS", by K. W. Goossen et al., IEEE Photonics Technology Letters, 6, pp. 1119–1121 (September 1994). As is known in the art, a MARS modulator array can be designed to produce a desired wavelength response. If the MARS modulator is fabricated on a chip so that regions between active areas are transmissive or absorptive, then the modulator can produce broad wavelength pass bands. Alternatively, a MARS modulator array can be designed to restrict the reflected wavelengths to specific narrow channels by using a narrow slit modulator configuration. Adversely, MARS modulator arrays can also be fabricated with a continuous active area to create a continuous transmission band. In such a configuration, the transmission spectra can be a smoothly varying function of wavelength which does not restrict the operating wavelengths. Such a modulator configuration can be set with drive voltages so as to correct for the gain spectra of a chain of amplifiers. If a MARS modulator is used in the present invention attenuation device and the attenuation settings are known to vary around a smoothly varying curve, then it will be understood that it is possible to apodize the transmission function of the overall attenuation device. For example, if the gain of certain amplifiers is known to be higher in the middle of the wavelength range, then a smoothly varying partial attenuator with lower center transmission can be placed over the center of the MARS modulator array. Such an apodization function could be fabricated directly onto the array by overcoating the modulators with an absorbing layer of varying thickness. Alternatively, a glass plate with the desired transmission function can be placed directly in front of the modulator array at a point close to the image plane.

In the shown embodiment, the modulators 41 on the modulator array 40 have a pitch spacing selected so that each wavelength of light reflected by the blazed diffraction grating 34 is focused upon a different modulator 41 within the modulator array 40 by the focusing lens arrangement 36. As the different wavelengths of light impinge upon their corresponding modulators 41 within the modulator array 40, the degree of light reflection produced by each modulator 41 is controlled by a modulator controller 44. As will be later explained, the modulator controller 44 regulates the modulator array 40 so that strong wavelength signals are attenuated to better match the signal strength of weaker wavelength signals.

The modulated light reflected from the modulator array 40 is directed through the focusing lens arrangement 36. The modulated light is directed through the focusing lens arrangement 36 at a point off-center, wherein the light leaving the modulator array 40 does not interfere with the light passing through the focusing lens arrangement 36 on its way to the modulator array 40. The focusing lens arrangement 36 redirects the reflected light against the blazed diffraction grating 34 at substantially the same angle that light originally left the blazed diffraction grating 34. Consequently, the various wavelengths of light are multiplexed by the blazed diffraction grating 34 and the multiplexed beam of light is collimated.

A second collimator lens arrangement 46 is provided that is optically aligned with the face of an output fiber 48. The blazed diffraction grating 34 directs the collimated multiplexed light to the second collimator lens arrangement 46. The second collimator lens arrangement 46 is identical in construction to the first collimator lens arrangement 30. As a result, the second collimator lens arrangement 46 focuses the collimated multiplexed light onto the output fiber 48. The multiplexed signal directed to the output fiber 48 contains the same signals at the same wavelengths as did the input fiber 32. However, the signals carried by wavelengths having high intensities have been attenuated so that all the wavelength signals have a signal strength that fall within a common range.

The degree to which the modulator controller 44 instructs the modulator array to alter wavelength strengths can be varied in many ways. In its simplest form, the modulator controller 44 can be controlled by an operator who analyzes the various wavelength signal strengths traveling in the output fiber 48. However, in the preferred embodiment, an automated control system is used. In FIG. 1, it can be seen that detectors 50, 52 are positioned at points adjacent to the modulators 41 on the modulator array 40 and are preferably formed on the same silicon substrate as are the modulators 41. Normally detectors fabricated in silicon are not highly sensitive to the range of light near 1.55 μm commonly used in optical communications. In the preferred embodiment, however, compound semiconductor devices are integrated with the membrane anti-reflection switch modulators 41 on the modulator array 40 using flip-chip bonding of the compound semiconductor devices onto the silicon substrate. The integrated compound semiconductor devices form broadband detectors having the proper operational wavelength range. The process of integrating compound semiconductor devices on a silicon-based modulator array is shown in "GaAs MQW MODULATORS INTEGRATED WITH SILICON CMOS", by K. W. Goossen et al., IEEE Photonics Technology Letters 7(4), pp. 360–362 (April 1995). The integration of compound semiconductor devices onto a silicon substrate to create detectors sensitive to 1.55 μm light is only one exemplary embodiment of how to create an array with both modulators and detectors. In an alternate embodiment, the modulator array can be fabricated on an InP substrate or GaAs substrate, both of which are compatible with commercially available 1.55 μm detectors.

In FIG. 1, input detectors 50 are disposed on one side of the modulators 41 within the modulator array 40 and the output detectors 52 are disposed on the opposite side of the modulators 41 within the modulator array 40. A diffractive beamsplitter 54 is positioned between the blazed diffraction grating 34 and the focusing lens arrangement 36. The diffractive beamsplitter 54 is positioned in the path of the light coming in from the input fiber 32. As the incoming light reflects from the blazed diffraction grating 34 and passes through the diffractive beamsplitter 54, the diffractive beamsplitter 54 diffracts approximately 1% of the light onto a secondary optical path 55, prior to the light entering the focusing lens arrangement 36. As the 1% of light traveling along the secondary optical path 55 enters the focusing lens arrangement 36, the focusing lens arrangement 36 focuses the light onto the input detectors 50. The input detectors 50 read the intensity of the various incoming wavelengths and relay that information to the modulator controller 44.

A partial mirror element 58 is positioned between the blazed diffraction grating 34 and the focusing lens arrangement 36. The partial mirror element 58 is positioned in the path of light heading toward the output fiber 48 from the modulator array 40. As the exiting light impinges upon the partial mirror element 58, approximately 99% of the light is unaffected and travels directly through the partial mirror element 58. The remaining 1% of the light is reflected by the partial mirror element 58. The partial mirror element 58 is angled so that the 1% of the light reflected by the partial mirror element 58 is directed along a secondary optical path 59 back through the focusing lens arrangement 36. As the 1% of the reflected light traveling along the secondary optical path 59 enters the focusing lens arrangement 36, the focusing lens arrangement 36 focuses that light onto the output detectors 52. The output detectors 52 read the intensity of each wavelength of light reflected by the modulator array 40 and relay that information to the modulator controller 44.

Being coupled to either the input detectors 50, the output detectors 52 or both, the modulator controller 44 regulates the modulator array 40 in an automated fashion so that the light passing through the equalizer device 12 is properly corrected.

Figure 2:
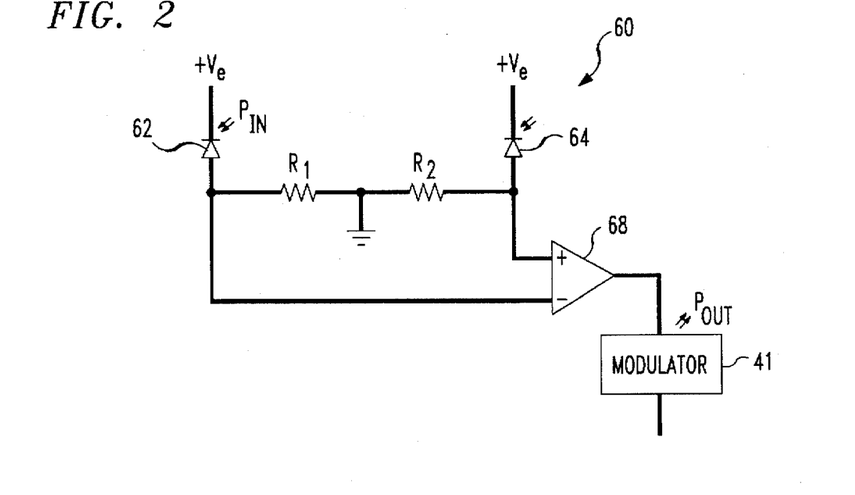
FIG. 2 is a schematic view of a first embodiment of a modulator control circuit.

In FIG. 1, an exemplary embodiment of the equalizer device 12 is shown having separate input detectors 50 and output detectors 52. By reading the various input detectors 50 and output detectors 52, the modulator controller 44 controls what fraction of incident power from the input fiber 32 is to be transmitted to the output fiber 48 for each wavelength. Referring to FIG. 2, a modulator control circuit 60 is shown containing an input detector, an output detector and a modulator for one wavelength. In the shown embodiment, the input detector and the output detector are both photodiodes 62, 64. The modulator 41 is coupled to the output of a comparator 68. The anode of the input detector photodiode 62 and the anode of the output detector photodiode 64 lead to separate input ports of the comparator 68. The anodes of both the input detector photodiode 62 and the output detector photodiode 64 are also joined in series with two resistors $R_1$ and $R_2$. As was previously explained, a portion of the light impinging upon the modulator array 40 (FIG. 1) is directed toward a corresponding input detector photodiode 62. Similarly, a portion of the light reflected by the modulator array 40 (FIG. 1) is directed toward a corresponding output detector photodiode 64. As the light impinges upon each input detector photodiode 62 and each output detector photodiode 64, a fraction of the power is absorbed by the detectors. For the circuit 60 shown in FIG. 2, it is presumed that the reflection of the modulator 41 will decrease with increasing voltage. As such, the polarity of the inputs to the comparator 68 are chosen accordingly. In the case that the modulator 41 has a reflectivity that increases with increasing voltage, the inputs of the comparator 68 should be interchanged. In the modulator control circuit 60 of FIG. 2, the operation of the attenuation device 12 (FIG. 1) will result in the voltage of each modulator 41 being adjusted so that $$R_1 P_{in} f_{in} = R_2 P_{out} f_{out} \qquad \text{[Equation 1]}$$

assuming for simplicity that the two photodetectors 62, 64 are substantially identical. In Equation 1, R1 and R2 are the resistors shown in FIG. 2, $f_{in}$ is the fraction of power absorbed by the input detector photodiode 62, $f_{out}$ is the fraction of power absorbed by the output detector photodiode 64, $P_{in}$ is the incident power on the modulator 41 and $P_{out}$ is the reflected power output of the modulator diode 41. The power incident upon the output detector photodiode 64 is $P_{out}f_{out}$. By rearranging Equation 1, it can be deduced that $$\frac{P_{out}}{P_{in}} = \frac{R_1}{R_2} \frac{f_{in}}{f_{out}} \qquad \text{[Equation 2]}$$

To avoid wasting power, the beamsplitters 54, 58 (FIG. 1) are designed to deflect as little power as possible. Furthermore, if the input detector photodiode 62 is fabricated to be identical to the output detector photodiode 64 and the two beamsplitters 54, 58 (FIG. 1) have equal deflection efficiencies, so that both detectors have an identical wavelength response, then $f_{in}/f_{out}=1$. By substituting these values into Equation 2, it can be seen that $$\frac{P_{out}}{P_{in}} \approx \frac{R_1}{R_2} \qquad \text{[Equation 3]}$$

Consequently, the ratio between the power received by the input detector photodiode 62 and the power reflected by the modulator 41 is directly proportional to ratio of resistances between $R_1$ and $R_2$. As such, it can be seen that the ratio between input power $P_{in}$ and output power $P_{out}$ is substantially independent of the operational characteristics of the modulator 41. This enables the ratio between input power $P_{in}$ and output power $P_{out}$ to be set electrically by substituting a variable resistance circuit in place of resistor $R_1$ and resistor $R_2$. Variation in the modulators 41 contained within the modulator array, therefore have a limited effect on the overall operation of the attenuation device 12 (FIG. 1).

Figure 3:
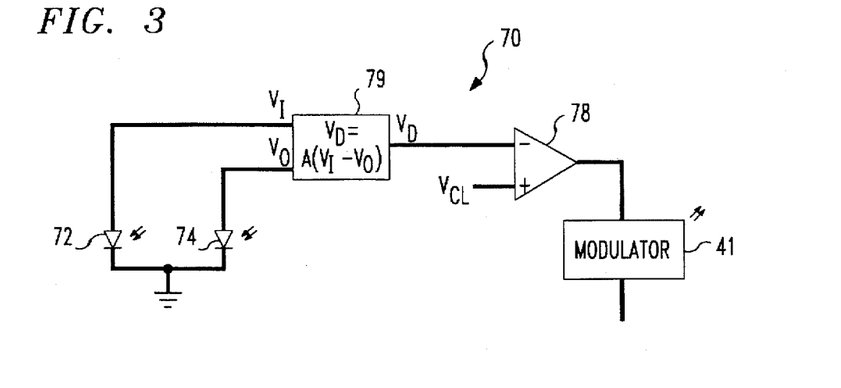
FIG. 3 is a schematic view of a second embodiment of a modulator control circuit.

Referring to FIG. 3, an alternate embodiment of a modulator control circuit 70 is shown for controlling the output of a modulator 41 in the modulator array 40 (FIG. 1). In FIG. 3, the input detector and the output detector are forward biased photodiodes 72, 74. The modulator 41 is coupled to the output of a comparator 78 that receives a control voltage $V_{CL}$ at one input port. The anode of the input detector photodiode 72 and the anode of the output detector photodiode 74 lead to separate input ports of a differential voltage amplifier 79. The output of the differential voltage amplifier 79 leads to the comparator 78, wherein the output of the differential voltage amplifier 79 is compared to the control voltage $V_{CL}$. It is well known to those skilled in the art that the voltage generated by a photodiode is substantially proportional to the logarithm of the incident light power. The voltages generated by light impinging upon both the input detector photodiode 72 and the output detector photodiode 74 are proportional to the logarithm of the optical power incident upon the input detector photodiode 72 and the output detector photodiode 74, respectively. As a result, the difference between the voltages of the input detector photodiode 72 and the output detector photodiode 74 is directly proportional to the logarithm of the ratio between the input optical power and the output optical power. The difference of the logarithms of the two quantities is equal to the logarithm of the ratio of the quantities. Hence, the control of the power ratio can therefore be controlled logarithmically using a single control voltage $V_{CL}$, as shown in FIG. 3.

The modulator control circuits shown in FIG. 2 and FIG. 3 are not restricted to the use of electro-absorptive modulators. Rather, such circuits can work to control any modulator whose output decreases monotonically with increasing voltage. Such circuits can be adapted for use with modulators having an output that increases monotonically with increasing voltage by interchanging the positive and negative inputs on the comparators.

In the embodiment of FIG. 1 and the circuits of FIG. 2 and FIG. 3, a separate modulator, input detector and output detector are provided for each wavelength of light. Such embodiments are merely exemplary and it should be understood that just one detector could be used with a modulator.

Figure 4:
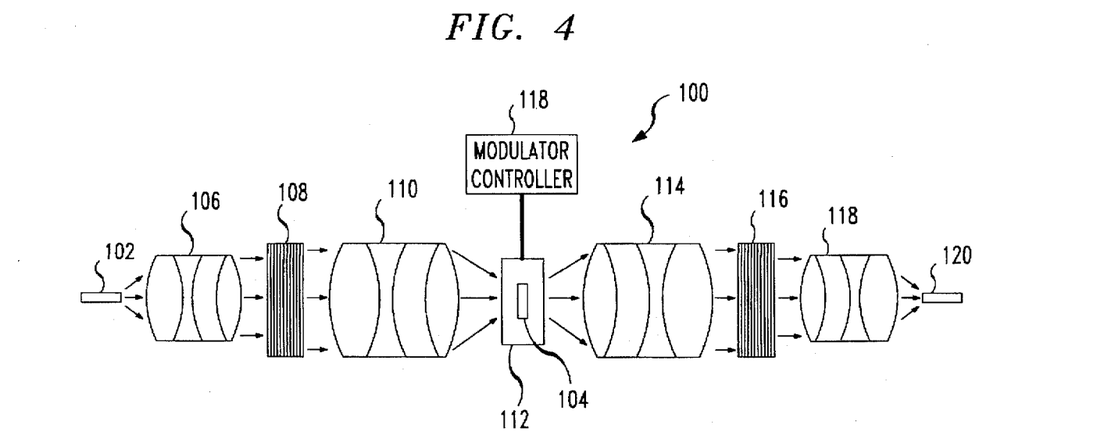
FIG. 4 is a schematic view of an alternate embodiment of an optical signal equalizer in accordance with the present invention.

Referring to FIG. 4, an alternate embodiment of an attenuation device 100 is shown in accordance with the present invention. The shown embodiment uses transmissive modulators 104. The attenuation device 100 includes a first collimator lens arrangement 106 that is optically aligned with an input fiber 102. The input fiber 102 has a flush termination surface. The optical signal carried by the input fiber 102 is emitted trough the flush termination surface, wherein the signal is received by the first collimator lens arrangement 106. The lens elements contained within the first collimator lens arrangement 106 are selected to focus all the wavelengths emitted by the input fiber 102 at a substantially infinite conjugate. A first blazed diffraction grating 108 is positioned along the same optical path as is the first collimator lens arrangement 106. The collimated multiplexed light signal exiting the first collimator lens arrangement 106 impinges upon the first blazed diffraction grating 108, wherein each wavelength of light is dispersed at an angle proportional to its wavelength. The various wavelengths received by the first blazed diffraction grating 108 are directed toward a first focusing lens arrangement 110. The diameter of the various lens elements contained within the first focusing lens arrangement 110 are sized so that the first focussing lens arrangement 110 receives all the wavelengths from the first blazed diffraction grating 110.

The first focusing lens arrangement 110 focuses the various wavelengths of light at different points on a modulator array 112. As the different wavelengths of light impinge upon corresponding modulators 104 within the modulator array 112, the degree of light transmission produced by each modulator 104 is controlled by a modulator controller 118. The modulated beams of light transmitted through the modulator array 112 are directed through a second focusing lens arrangement 114. The second focusing lens arrangement 114 redirects the light against the second blazed diffraction grating 116. Consequently, the various wavelengths of light are multiplexed by the second blazed diffraction grating 116 and the multiplexed beam of light is collimated.

A second collimator lens arrangement 118 is provided that is optically aligned with the face of an output fiber 120. The second blazed diffraction grating 116 directs the collimated multiplexed light to the second collimator lens arrangement 118. The second collimator lens arrangement 118 is identical in construction to the first collimator lens arrangement 106. As a result, the second collimator lens arrangement 118 focuses the collimated multiplexed light onto the output fiber 120. The multiplexed signal directed to the output fiber 120 contains the same signals at the same wavelengths as did the input fiber 102. However, the signals carried by wavelengths having high intensities have been attenuated so that all the wavelength signals have a signal strength that fall within a common range.

In its simplest form, the modulator controller 118 can be an operator who analyzes the various wavelength signal strengths traveling in the output fiber 120.

In the transmissive embodiment of FIG. 4, it will be understood that the modulator, input detector and output detector can be manufactured in a stacked configuration on a common substrata s that all three components are at the same point.

Figure 5:
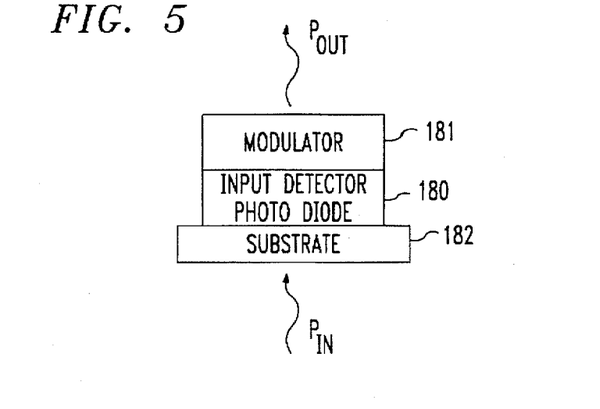
FIG. 5 shows a schematic view of the structure of a stacked semiconductor configuration containing an input detector photodiode and a modulator.

Referring to FIG. 5, an embodiment is shown having an input detector photodiode 180 and a electro-absorptive modulator diode 181 manufactured in a stacked configuration on a common substrate 182, using epitaxial growth techniques, thin film deposition or similar manufacturing techniques. The shown embodiment contains only an input detector photodiode 180 and a modulator diode 181 for each wavelength of light. No separate output detector photodiode is provided. In certain types of absorptive modulators, including quantum well diode electroabsorptive modulators, the modulator can also simultaneously function as a detecting photodiode. In operation with the modulator control circuit 184 of FIG. 6, it is required that the modulator 181 simultaneously function as both a modulator and a detector. In the stacked configuration, incident light passes through the input detector photodiode 180 prior to reaching the modulator diode 181. As such, the input detector photodiode 180 absorbs a fraction (f) of the incident optical power, and the modulator diode 81 also absorbs a fraction of the incident optical power.

Figure 6:
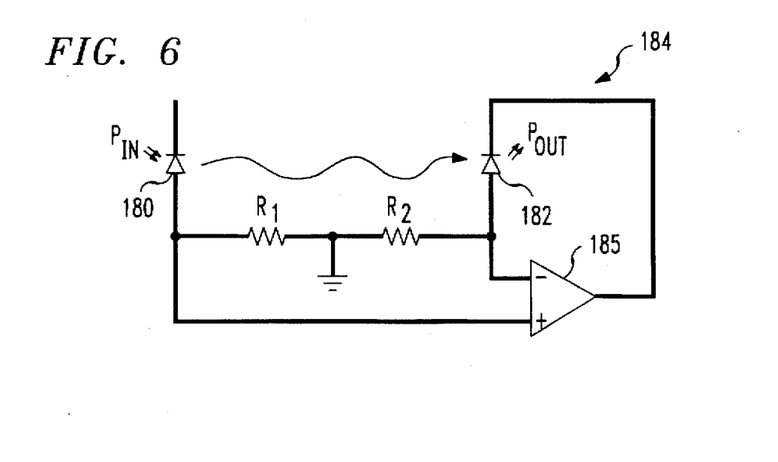
FIG. 6 is a schematic view of a third embodiment of a modulator control circuit for the stacked configuration shown in FIG. 5.

FIG. 6 shows a modulator control circuit 184 for the stack configuration of FIG. 5. In the modulator control circuit 184, the anode of the input detector photodiode 180 and the anode of modulator diode 181 are coupled to separate input ports of a comparator 185. The polarity of the input connections to the comparator 185 is chosen for the case where the absorption of the modulator diode 181 increases with increasing reverse bias voltage over a useful operating range. For the case where the modulator absorption decreases with increasing reverse bias voltage, the input to the comparator 185 will be reversed.

In FIG. 6 it can be seen that the anode of the input detector photodiode 180 and the anode of modulator diode 181 are coupled in series with two resistors $R_1$ and $R_2$ that connect to ground. The output of the comparator 185 is coupled to the cathode of the modulator diode 181. The modulator diode 181 is chosen so that the photocurrent generated is substantially proportional to the optical power absorbed over a useable operating range. Such a proportionality is a common characteristic of electro-absorption modulator diodes, such as quantum well diodes or Franz-Keldysh modulator diodes. With such a choice of a modulator diode 181, the ratio of absorbed powers in the modulator diode 181 and the input detector photodiode 180 is proportional to the ratio between the first resistor $R_1$ and the second resistor $R_2$. From the stacked arrangement, it will be understood that the output power ($P_{out}$) emitted by the modulator diode 181 has a relationship with regard to the incident light power ($P_{in}$) as expressed by $$P_{out} = P_{in} - fP_{in} - P_A \qquad \text{[Equation 4]}$$

where $P_A$ is the optical power absorbed by the modulator diode 181. However, in the shown embodiment, the photodiode 180 and the modulator diode 181 each pass one electron of photocurrent for each absorbed photon, in which case, the power ($P_A$) absorbed in the modulator diode 181 is also equal to the following $$P_A = \frac{R_1}{R_2} fP_{in} \qquad \text{[Equation 5]}$$

By substituting Equation 5 into Equation 4, it can be seen that the following ratio is obtained $$\frac{P_{out}}{P_{in}} = 1 - f\left(1 + \frac{R_1}{R_2}\right) \qquad \text{[Equation 6]}$$

Hence, the ratio of output power to input power may be set by the choice of resistors $R_2$ and $R_1$.

Figure 7:
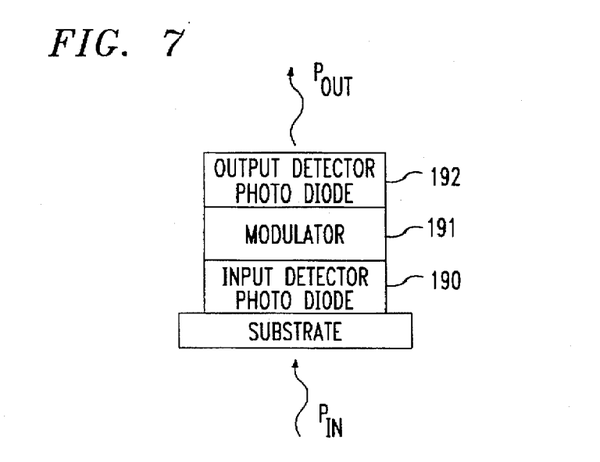
FIG. 7 shows a schematic view of the structure of a stacked semiconductor configuration containing an input detector photodiode, a output detector photodiode and a modulator.

Referring to FIG. 7, yet another embodiment is shown wherein an input detector photodiode 190, a modulator 191 and an output detector photodiode 192 are all manufactured in a stacked configuration using known epitaxial growth techniques. In such a configuration, the output power ($P_{out}$) is a function of the fraction ($f_1$) of power absorbed by the input detector photodiode 190, the fraction ($f_2$) of power absorbed by the output detector photodiodes 192 and the power ($P_A$) absorbed by the modulator 191. As a result, the output power ($P_{out}$) is expressed by $$P_{out} = P_{in} - f_1 P_{in} - P_A - f_2(P_{in} - f_2 P_{in} - P_A)$$

which reduces to $$P_{out} = P_{in}(1 - f_1 - f_2 + f_1 f_2) - P_A(1 - f_2) \qquad \text{[Equation 7]}$$

Figure 8:
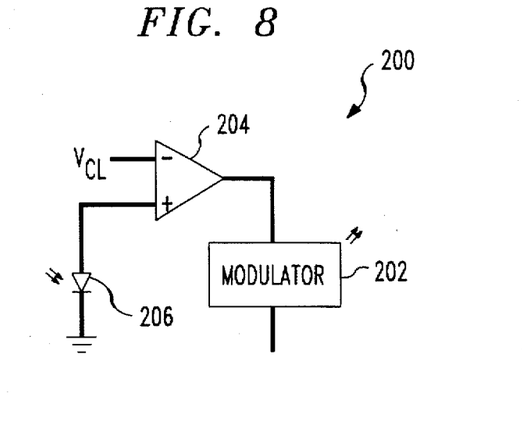
FIG. 8 is a schematic view of a fourth embodiment of a modulator control circuit.

A modulator control circuit can also be used that is intended to set a specific output power regardless of the input power received. Referring to FIG. 8, one such circuit 200 is shown for a modulator 202 having an output that decreases with increasing voltage. The modulator 202 is coupled to the output of a comparator 204 and to a voltage bias. One of the input ports of the comparator 204 is coupled to the anode of an output detector photodiode 206 connected in a photovoltaic mode in which the output voltage of the detector 206 changes substantially logarithmically with the light power incident on the detector 206. The opposite input port of the comparator 104 receives a control voltage $V_{CL}$. In the shown embodiment, the output power of the modulator diode 102 is set in a logarithmic fashion by changing the control voltage $V_{CL}$ leading to the comparator 104.

Figure 9:
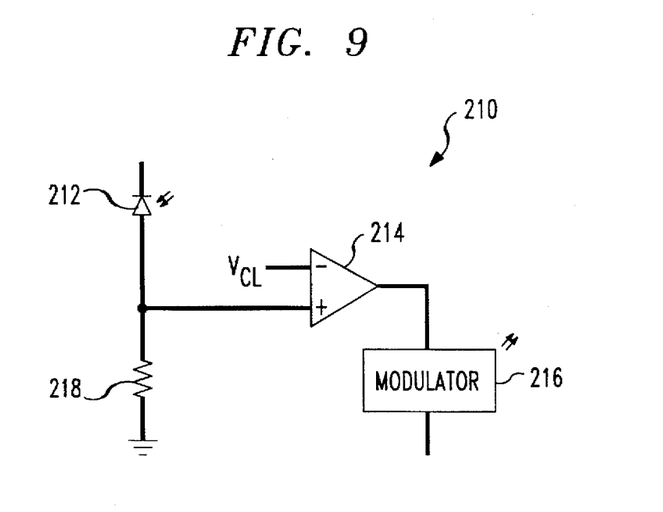
FIG. 9 is a schematic view of a fifth embodiment of a modulator control circuit.

Referring to FIG. 9, a modulator control circuit 210 is shown that is controlled by the logarithmic photovoltaic response of a photodiode 212 used as the output detector. In the shown embodiment, the anode of the output detector photodiode 212 is coupled to in input port of a comparator 214, wherein the voltage output of the output detector photodiode 212 is compared to control voltage $V_{CL}$. The output detector photodiode 212 produces a voltage across the resistor 218 that is proportional to the output power of the modulator diode 216. As a result, by choosing the control voltage $V_{CL}$ received by the comparator 214, the overall output power of the modulator diode 216 can be controlled. The polarity of the inputs to comparator 214 is chosen to suit a modulator 216 whose output decreases with increasing drive voltage.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. An optical signal attenuation device for selectively attenuating different wavelength signals contained within a multiplexed transmission, comprising:

a first diffraction element for diffracting the light associated with the multiplexed transmission, wherein each wavelength signal contained within the multiplexed transmission is directed along a separate optical path; and a modulator disposed along each separate optical path, wherein each modulator receives a wavelength signal from said diffraction element and causes a corresponding signal to be produced at a selective optical signal strength.

2. The device according to claim 1, wherein each signal produced by each said modulator is directed back through said first diffraction element, whereby said first diffraction element multiplexes each signal.

3. The device according to claim 1, further including a second diffraction element, wherein each signal produced by each said modulator is directed through said second diffraction element and said second diffraction element multiplexes each signal.

4. The device according to claim 1, further including a first collimator for substantially collimating the light associated with the multiplexed transmission, prior to the light being diffracted by said first diffraction element.

5. The device according to claim 1, further including a focusing lens arrangement disposed between said first diffraction element and each said modulator for focusing each wavelength signal onto a corresponding modulator.

6. The device according to claim 4, wherein the multiplexed transmission travels along an optical input fiber and said first collimator collimates the light, associated with the multiplexed transmission, emitted by the optical input fiber.

7. The device according to claim 6, further including a second collimator for focusing each signal emitted by each said modulator at an optical output fiber.

8. The device according to claim 1, wherein said first diffraction element is a diffraction grating.

9. An optical signal attenuation device for selectively attenuating different wavelength signals contained within a multiplexed transmission, comprising:
   a first diffraction element for diffracting the light associated with the multiplexed transmission, wherein each wavelength signal contained within the multiplexed transmission is directed along a separate optical path;
   a modulator disposed along each separate optical path, wherein each modulator receives a wavelength signal from said diffraction element and causes a corresponding signal to be produced at a selective optical signal strength; and
   a plurality of optical power detectors for detecting the optical power associated with each wavelength signal received by each said modulator.

10. The device according to claim 9, further including an optical element disposed between each said modulator and said first diffraction element for directing a portion of each wavelength signal emitted by said first diffraction element toward one of said plurality of optical power detectors.

11. An optical signal attenuation device for selectively attenuating different wavelength signals contained within a multiplexed transmission, comprising:
    a first diffraction element for diffracting the light associated with the multiplexed transmission, wherein each wavelength signal contained within the multiplexed transmission is directed along a separate optical path;
    a modulator disposed along each separate optical path, wherein each modulator receives a wavelength signal from said diffraction element and causes a corresponding signal to be produced at a selective optical signal strength; and
    a plurality of optical power detectors for detecting the optical power associated with each signal produced by each said modulator.

12. The device according to claim 11, further including a partially reflective surface disposed between each said modulator and said first diffraction element for reflecting a portion of each signal produced by each said modulator toward one of said plurality of optical power detectors.

13. An optical signal attenuation device for selectively attenuating different wavelength signals contained within a multiplexed transmission, comprising:
    a first diffraction element for diffracting the light associated with the multiplexed transmission, wherein each wavelength signal contained within the multiplexed transmission is directed along a separate optical path;
    a modulator disposed along each separate optical path, wherein each modulator receives a wavelength signal from said diffraction element and causes a corresponding signal to be produced at a selective optical signal strength; and
    a first plurality of optical power detectors for detecting the optical power associated with each wavelength signal received by each said modulator and a second plurality of optical power detectors for detecting the optical power associated with each signal produced by each said modulator.

14. The device according to claim 13, wherein each modulator includes a control circuit that controls the selective optical signal strength of the signal produced by each said modulator, wherein said control circuit maintains the selective optical signal strength at a value that is a function of a ratio between the optical power of each wavelength signal received by each said modulator and the optical power each signal produced by each said modulator.

15. The device according to claim 13, wherein said first plurality of optical power detectors, said second plurality of optical power detectors and each said modulator are disposed on a common semiconductor device.

16. In an optical network containing a plurality of optical fibers and at least one optical switch for selectively optically connecting at least some of said optical fibers together into one of a plurality of configurations, wherein each of the configurations disproportionately effects the signal strengths of the different wavelength signals contained within a multiplexed optical signal and causes the different signal strengths to vary in relation to one another outside an acceptable range, an attenuation device for correcting the optical signal, comprising:
    a first plurality of detectors for detecting the signal strength corresponding to each wavelength signal contained within the multiplexed optical signal; and
    an attenuator, coupled to said first plurality of detectors, for selectively attenuating the signal strength for each wavelength signal in the multiplexed optical signal to produce a corrected wavelength signal, wherein the signal strength for each corrected wavelength signal falls within said acceptable range.

17. The device according to claim 16, wherein said attenuator includes a first diffraction grating for diffracting the multiplexed optical signal, wherein each wavelength signal contained within the multiplexed optical signal is directed along a separate optical path; and
    a modulator disposed along each separate optical path, wherein each modulator receives a wavelength signal from said first diffraction grating and produces said corrected wavelength signal.

18. The device according to claim 17, wherein each signal produced by each said modulator is directed back through said first diffraction element, whereby said first diffraction element multiplexes each signal.

19. The device according to claim 17, further including a second diffraction element, wherein each signal produced by each said modulator is directed through said second diffraction element and said second diffraction element multiplexes each signal.

20. The device according to claim 16, further including a second plurality of detectors for detecting the signal strength corresponding to each corrected wavelength signal.

21. A method of equalizing the signal strengths of the different wavelength signals contained within a multiplexed optical signal, comprising the steps of:

separating each of said wavelength signals from said multiplexed optical signal;

correcting the signal strength associated with each of said wavelength signals so that the signal strength of each of said wavelength signals falls within a compatible range; and multiplexing each of said wavelength signals to produce a corrected multiplexed optical signal wherein all the wavelengths contained within the corrected multiplexed optical signal have a signal strength within said compatible range.

22. The method according to claim 21, wherein said step of separating each of said wavelength signals includes directing the light corresponding to said multiplexed optical signal onto a first diffraction grating, wherein the first diffraction grating directs each of said wavelength signals along a separate optical path.

23. The method according to claim 21, wherein said step of correcting the signal strength includes providing a modulator on each of said separate optical paths, wherein each modulator receives one of said wavelength signals and produces a corresponding corrected signal that has a signal strength that falls within said compatible range.

24. The method according to claim 21, wherein said step of multiplexing includes directing each said corresponding corrected signal toward said first diffraction grating, wherein said first diffraction grating combines each said corresponding corrected signal and produces said corrected multiplexed optical signal.

25. The method according to claim 21, wherein said step of multiplexing includes directing each said corresponding corrected signal toward said second diffraction grating, wherein said second diffraction grating combines each said corresponding corrected signal and produces said corrected multiplexed optical signal.

26. The method according to claim 22, further including the step of collimating the light of said multiplexed signal prior to the light being diffracted by said first diffraction grating.

27. The method according to claim 21, further including the step of focusing each of said wavelength signals on each of said separate optical paths onto said modulator.

28. The method according to claim 21, further including the step of detecting the signal strength of each of said wavelength signals in said multiplexed optical signal.

29. The method according to claim 28, further including the step of detecting the signal strength of said wavelength signals after said wavelength signals have been corrected.

* * * * *